Figure 1:
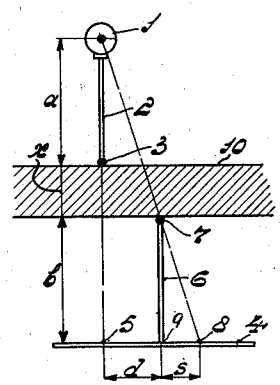

Inventors.
Albert Bouwers and Willem Hondius Boldingh.
By
Attorney.

Oct. 13, 1936. A. BOUWERS ET AL 2,057,325
METHOD AND DEVICE FOR MEASURING THICKNESSES WITH PENETRATING RAYS
Filed Jan. 12, 1932 2 Sheets-Sheet 2

Inventors,
Albert Bouwers and Willem Hondius Boldingh.
By
Attorney.

Patented Oct. 13, 1936

2,057,325

UNITED STATES PATENT OFFICE 2,057,325

METHOD AND DEVICE FOR MEASURING THICKNESSES WITH PENETRATING RAYS

Albert Bouwers and Willem Hondius Boldingh, Eindhoven, Netherlands, assignors, by mesne assignments, to N. V. Philips' Gloeilampenfabrieken, Eindhoven, Netherlands, a Dutch company Application January 12, 1932, Serial No. 586,224
In Germany February 6, 1931

7 Claims. (Cl. 250—34)

This invention relates to a method and apparatus for measuring the thickness of bodies with the aid of X-rays or other penetrating radiation, and is particularly adapted for measuring the thickness of walls whose thickness cannot be measured directly, viz. when measuring the thickness of partition walls placed between two chambers and the perforation of which is either undesired or impossible, for instance with vessels.

According to the invention one or more marks are provided in a beam of penetrating rays which traverses the wall to be measured and the source of which is placed at a definite distance from the wall. Said marks form shadows in the image projected on a screen (fluorescent screen, cryptoscope or photographic plate). The size of the shadow or the distance between these shadows is measured, and from these measurements the thickness of the wall may be computed by taking into account the position of the mark or marks.

The mathematical calculations involved in the determination of the thickness are materially simplified by placing the mark or marks closely against the body, in accordance with the following examples.

In order to maintain the definite distance from the wall, in the device adapted for carrying out this method the source of rays or the screen or both of them are provided with a distance member which bears on the wall. These distance members may serve at the same time for the attachment of the mark or marks.

Calculations may be avoided altogether by using a device in which the screen is provided with a scale division on which the thickness of the wall to be measured may be directly read. A separate measuring device serving for determining the distance may also be provided with such graduations.

Consequently the device is furnished with a scale division whose figures do not indicate the actual length of the graduations but indicate the thickness of the wall to be measured pertaining to the length.

For measuring very thick walls according to the above method, very hard X-rays and consequently X-apparatus for extremely high tensions are required. Since such devices are, of course, difficult to move and more cumbersome than devices working with lower tensions, the method carried into effect by means of electric apparatus is less simple as the bodies to be measured are thicker.

This drawback may be avoided by using as source of rays radio-active substances emitting $\gamma$-rays, for instance, radium C and radium-emanation.

Figure 2:
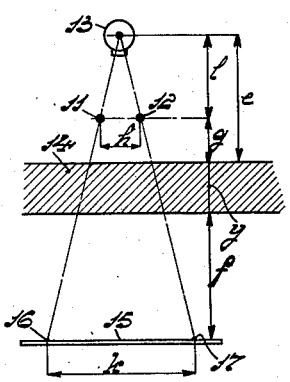
Figure 3:
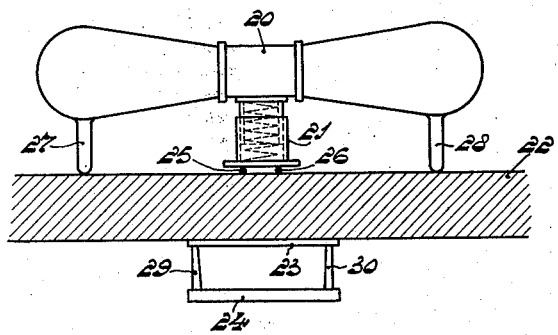
Figure 4:
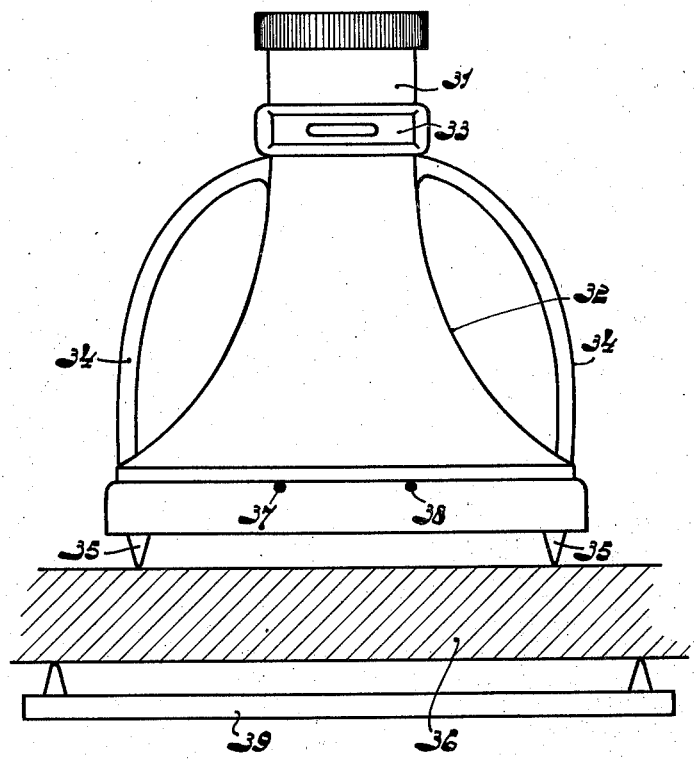

The invention will be more clearly understood by reference to the accompanying drawings, wherein Figs. 1 and 2 are diagrams illustrating the method according to the invention and Figs. 3 and 4 show devices adapted for carrying this method into effect.

Fig. 1 shows an X-ray tube 1 producing a diverging beam of X-rays and a screen 4 for the optical observation of the effect of the rays. A wall 10 whose thickness must be determined is located between the tube and the screen.

The X-ray tube has secured to it a distance member 2 at the end of which is provided a mark 3 preferably consisting of a material by which the X-rays are absorbed to a higher extent than by the material of the wall 10. In case of a metal wall, for instance, a wall of a vessel, it is preferred to use a mark of lead or tungsten, so that a clearly visible shadow is produced. The mark is placed against the wall so that the tube is always at the same distance $a$ from the side of the wall 10 facing it. Thus it is ensured that the beam of rays strikes the wall at right angles.

The screen 4 is provided with a scale division on which the thickness to be measured may be read. For this purpose the screen is arranged in such a manner that the shadow of the mark 3 coincides with a mark 5 arranged on the screen.

The screen is equipped in its turn with a distance member 6 which is placed perpendicularly to the side of the wall facing the screen and which has a length $b$. At the end of this distance member is also arranged a mark 7 which is represented as a shadow 8 in the X-ray image. In accordance with the thickness $x$ of the wall between the marks 3 and 7 the position of the shadow 8 changes. By means of a simple geometric relation the thickness $x$ of the wall to be measured may be computed from the distance of the shadow 8 from the foot point 9 of the distance member 6.

If the distance of the shadow 5 from the foot point 9 of the distance part 6 be denoted by $d$ and the distance of the shadow 8 from this foot point by $s$ then:

$$(a+b+x):b=(d+s):s$$

so that $$x=\frac{1}{s}\cdot db-a \qquad (1)$$

As the values $d$ and $b$ and $a$ are constant, the thickness $x$ of the body 10 may be determined by measuring the value $s$ by means of the Equation (1). However, it is also possible to use a device by which this calculation is rendered superfluous.

For this purpose either the screen or a measuring device with the aid of which the distance is determined, is provided with a scale division on which, instead of the actual length of the graduations, are, indicated the values of $x$ which bear proportion to this length in the ratio referred to above.

In Fig. 2 both of the marks 11 and 12 are arranged between the tube 13 and the wall 14 and in a line parallel to the screen. The screen is denoted by 15 and the shadows of the marks 11 and 12 projected on this screen are designated by 16 and 17. The two marks 11 and 12, spaced apart a distance $h$, are equivalent to a single mark having a length $h$ transverse to the beam of X-rays.

The values to be considered are denoted as follows:

$y$=the thickness of the body to be measured.
$e$=the distance of the tube from the body.
$f$=the distance of the screen from the body.
$g$=the distance of the marks from the body.
$h$=the distance between the marks.
$k$=the distance between the shadows 16 and 17.
$l$=the distance of the tube from the line of the marks.

From the drawings appear the relation.

$$\frac{h}{e-g}=\frac{k}{e+y+f} \qquad (2)$$

$e$, $f$, $g$ and $h$ are known constants and $k$ is measured and is thus also known. From this equation the value $y$ may be computed.

By reducing the distance $g$ or $f$ to zero the calculation is simplified and with moderate thicknesses it is therefore advisable to place the marks as well as the screen against the wall. It goes without saying that this is not possible if one or both of the marks are arranged on the screen side of the wall. Consequently this second manner in which the measuring method may be carried into effect will in some cases be simpler than the first method. In addition with the method referred to in Fig. 2 is it not necessary to take care of a definite adjustment. Furthermore the second method is more suitable for using a scale division by which the thickness to be measured is directly indicated, because it permits of using a linear scale.

From the Equation (2) it follows that $$y=\frac{e-g}{h} \cdot k - (e+f)$$

This formula may be simplified as follows:

$$y=mk-n,$$

in which $m$ and $n$ are constants.

The scale division on the screen or on the measuring device may be graduated in units of $m$ so that each time the constant $n$ must be subtracted only from the value $mk$ measured for obtaining the thickness of the wall. This subtraction may also be made up for in the scale division, so that only the value of $k$ need be read when measuring.

Fig. 3 shows a metal envelope 20 which is grounded during operation and which contains an X-ray tube. The rays of this tube pass through an applicator 21, penetrate through the wall 22 to be measured, and strike on the other side successively a photographic film 23 protected from the daylight and a fluorescent screen 24.

The applicator 21 consists of two telescoping parts, one of which is secured to the X-ray tube in front of the window through which the rays emerge from the tube. The second part carries a disc to which two straight tungsten wires 25 and 26 are fixed which serve as marks and are kept taut and pressed against the wall 22 by means of a spring.

The distance members 27 and 28 forming part of the envelope of the X-ray tube, and whose length may be variable if desired, serve to locate the X-ray tube at a definite distance from the wall. The correct distance of the screen from the wall is ensured by placing the pins 29 and 30 which are fixed to the screen against the film 23. At the same time the film is pressed against the wall by said pins.

With the aid of the device shown in Fig. 3 the thickness of the wall 22 may be determined by optical observation of the shadows of the wires 25 and 26 on the fluorescent screen. For controlling purposes, however, an X-ray image is also taken photographically on the film 23. Due to its flexibility, the film has the advantage that it may closely bear on the wall, even if the wall has a local recess.

Fig. 4 refers to a manner of carrying the method into effect with the aid of $\gamma$ rays emitted by radioactive substances. This figure shows a device comprising a case 31 containing the radioactive material and an applicator 32 to which the case is secured. A movable shutter 33 shaped as a lead slide normally prevents the rays from emerging and may be opened during operation. A pair of handles 34—34 facilitate the use of the device, whose pins 35 are placed against the wall 36 to be measured and which is equipped with marks 37 and 38 whose shadows are observed on a sensitive screen 39. When referring, in the claims, to the screen or marking means as being located at a predetermined or definite "distance" from the body being measured, it is to be understood that this phrase also includes the case where the screen or marking means are in contact with the body, the "distance" in this instance being zero.

What we claim is:

1. A device for measuring the thickness of a plate-shaped body having parallel surfaces comprising a source of penetrative rays, two markers disposed between the source and the body, a ray-receiving member disposed on the other side of the body, to receive the shadows of said markers, said source, markers and ray-receiving member being disposed at fixed predetermined distances from said body, the distance between the shadows of said markers giving a measure of the thickness of said body.

2. The method of measuring with the aid of pentrative rays the thickness of a sheet-shaped body having parallel surfaces, comprising subjecting one side of the body to penetrative rays, placing at a fixed distance from the body and in the direction of the rays striking the body at least two ray-absorbing marker points, and determining from the distance between the shadows of said points on a ray sensitive member, located at a definite predetermined distance from the other side of the body, the thickness of the body.

3. A device for measuring the thickness of a sheet-shaped body having parallel surfaces, comprising a radiator of a beam of divergent penetrative rays disposed on one side of the body, two marker points of a material opaque to said rays disposed in the beam of said rays, said points being spaced from each other and disposed at a fixed and predetermined distance from said body, and a ray-sensitive member to receive the shadows of said points and disposed at the other side of the body from the radiator and at a fixed and predetermined distance therefrom.

4. In an arrangement for measuring the thickness of a sheet-shaped body by using two shadow-points of a member, a device for producing the shadow-points comprising, a source of rays, a member connected to said source and adapted to be placed in contact with the surface of said body, and at least two wires to produce the shadow-points, said wires being attached to said member and being of a material which is opaque to the rays and being arranged in the field of the rays parallel to each other and at a definite distance from the center of the rays, said wires being parallel to and at a definite distance from said surface when the member is operatively placed in contact with said surface.

5. The method of determining the thickness of a sheet-shaped body with the aid of X-rays comprising the steps, subjecting one side of the body to radiation from a source of X-rays located a known distance therefrom, disposing an X-ray sensitive member at the opposite side of the body and at a known distance from the adjacent surface thereof, placing between the source and the body to throw a shadow on said member means of a material having a high X-ray absorbing capacity and having two points spaced apart a known distance and spaced from the body by equal known distances, measuring the distance between two points of the shadow corresponding to the two points of the means, and computing the thickness of the body from the distances of the source and the points from the body, the distance of the member from the body, the measured distance between the two points of the shadow, and the distance between the two points of the means.

6. An apparatus for measuring the thickness of a body having parallel surfaces, comprising a source of penetrating rays, a marker between said source and said body, a second marker on the other side of the body, said markers being at fixed distances from said body, and a member subjected to the penetrative rays to receive the shadows of said markers and being at a fixed distance from said body, the distance between the shadows of said markers giving a measure of the thickness of said body.

7. A method of measuring the thickness of a body comprising the steps, subjecting the body to the action of penetrative rays from a source located at one side thereof, intercepting two selected rays by members opaque to said rays, measuring the distance between the shadows of the opaque members on a ray-sensitive member, and computing from the distance between the shadows, the distance between the source and the adjacent surface of the body, the distance of the shadows from the adjacent side of the body, and from the location of the opaque members, the thickness of the body.

ALBERT BOUWERS.
WILLEM HONDIUS BOLDINGH.